United States Patent [19]

Okuda et al.

[11] Patent Number: 5,858,521
[45] Date of Patent: Jan. 12, 1999

[54] VIBRATION DAMPER MATERIAL COMPRISING A VICSO ELASTIC LAYER OF UNVULCANIZED RUBBER

[75] Inventors: Takuya Okuda, Yono; Toshio Sugizaki, Ohmiya; Masao Kogure, Hukiage-machi; Takanori Saitoh, Misato, all of Japan

[73] Assignee: Lintec Corporation, Japan

[21] Appl. No.: 478,106

[22] Filed: Jun. 7, 1995

[30] Foreign Application Priority Data

Jul. 25, 1994 [JP] Japan .................................. 6-193670

[51] Int. Cl.⁶ ...................................................... B32B 11/00
[52] U.S. Cl. ........................ 428/219; 428/220; 428/340; 428/489; 428/492; 428/543
[58] Field of Search .................... 428/219, 220, 428/489, 492, 543, 340

[56] References Cited

U.S. PATENT DOCUMENTS

| | | | |
|---|---|---|---|
| 3,658,635 | 4/1972 | Eustice | 161/190 |
| 4,056,161 | 11/1977 | Allen, Jr. | 181/290 |
| 4,278,726 | 7/1981 | Wieme | 428/229 |
| 4,347,280 | 8/1982 | Lau et al. | 428/304.4 |
| 4,623,586 | 11/1986 | Umeya et al. | 428/324 |
| 4,899,323 | 2/1990 | Fukahori et al. | 367/176 |
| 4,981,737 | 1/1991 | Rico | 428/40 |
| 5,082,706 | 1/1992 | Tangney | 428/40 |
| 5,213,879 | 5/1993 | Niwa et al. | 428/213 |
| 5,262,232 | 11/1993 | Wilfong et al. | 428/327 |
| 5,300,355 | 4/1994 | Mifune et al. | 428/215 |
| 5,358,772 | 10/1994 | Nakagawa et al. | 428/148 |

FOREIGN PATENT DOCUMENTS

| | | |
|---|---|---|
| 513171 | 10/1939 | United Kingdom . |
| 2 113 346 | 8/1983 | United Kingdom . |
| WO82/04454 | 12/1982 | WIPO . |

OTHER PUBLICATIONS

Article entitled *"Frequency And Loss Factors of Sandwich Beams Under Various Boundary Conditions"*, D.K. Rao, Journal Mechanical Engineering Science, vol. 20, No. 5, 1978, pp. 271–282.

*Primary Examiner*—H. Thi Le
*Attorney, Agent, or Firm*—Brinks Hofer Gilson & Lione; G. Peter Nichols

[57] ABSTRACT

The vibration damper material comprises a laminate of a viscoelastic layer and a hardenable pressure sensitive adhesive layer, and a release liner applied onto the hardenable pressure sensitive adhesive layer. The viscoelastic layer is intended to form a vibration damping layer, and contains a viscoelastic material mainly comprised of unvulcanized rubber to which a vulcanizing agent (crosslinking agent) has been added. The hardenable pressure sensitive adhesive layer comprises a hardenable pressure sensitive adhesive which has adhesive properties in the uncured state but has a strong adhesive strength when it is cured by heating, irradiation with light or by being blocked from air for example. This hardenable pressure sensitive adhesive layer contains a sticking polymer, a reactive oligomer and a polymerization initiator. The release liner which is utilized has a silicone layer formed on the surface of a base material thereof. This vibration damper material has an excellent ability to follow curved surfaces, a reliable adhesivity, and provides a high degree of vibration damping property without impairing the efficiency in the operation in which the vibration damper material is applied onto an adherend.

3 Claims, 2 Drawing Sheets

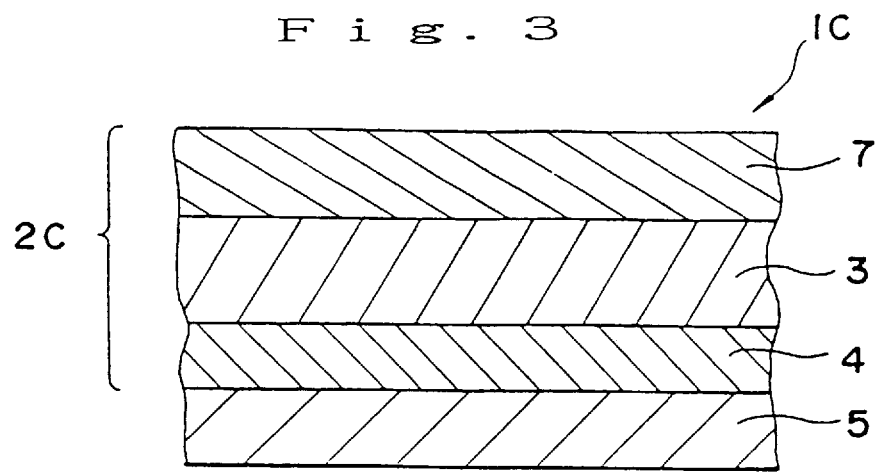
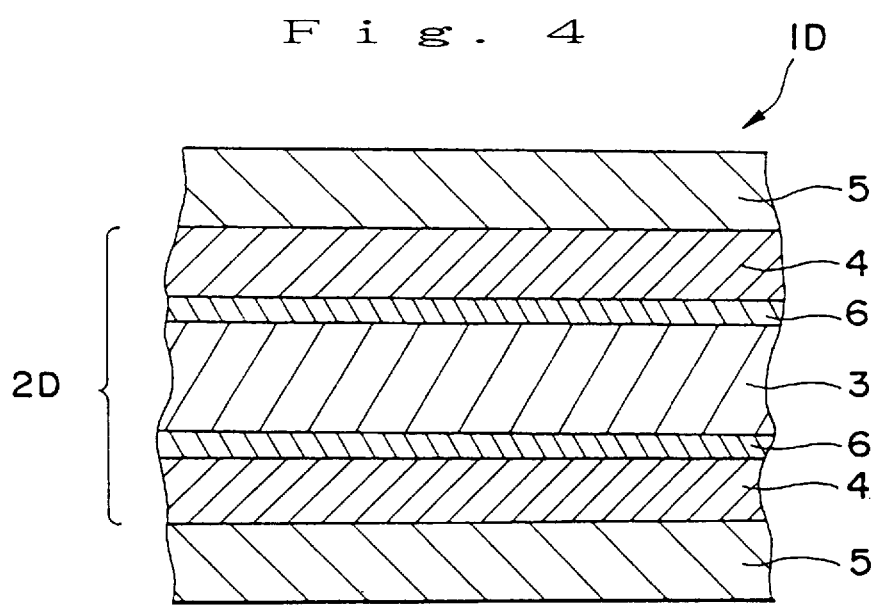

VIBRATION DAMPER MATERIAL
COMPRISING A VICSO ELASTIC LAYER OF
UNVULCANIZED RUBBER

BACKGROUND OF THE INVENTION

1. Field of the Invention

The present invention relates to a vibration damper material which exhibits vibration damping properties when it is used.

2. Description of the Background Art

Vibration damper materials comprised vibration damping layers utilizing viscoelastic materials are known as materials which can suppress vibrations and noise. Such vibration damper materials are utilized by being adhered or stuck onto an adherend to provide vibration damping effect of the adherend. For example, they are placed on the floors of automobiles and around such areas to prevent vibrations and noise from being transmitted inside the vehicle.

One of such vibration damper materials is a sheet in which a pressure sensitive adhesive layer is bonded to a vibration damping layer consisting of an asphalt sheet or a vulcanized rubber sheet. However, such vibration damping sheets have problems in that the asphalt sheet and the vulcanized rubber sheet have a high modulus of bending elasticity. As a result, they have an impaired ability to follow curved surfaces and impaired adhesive reliability when they are applied to curved areas. Therefore, there is a risk that the pressure sensitive adhesive layer will peel when, for example, the temperature changes or they suffer vibrations or impacts. As a result, gaps are formed between the adherend and the pressure sensitive adhesive layer, thus leading to loss of the vibration damping ability.

In order to prevent such peeling from occurring there is a one method whereby the asphalt sheet is adhered to the adherend using an adhesive. However, this method has two main disadvantages. First, that it takes time to coat and dry the adhesive and the operating efficiency is poor.

There is also another method in which the vibration damping sheet is formed in advance with a shape which is similar to the curved surface of the adherend. However, this method is impractical since it is not very widely applicable and there will be cases where the shape of the adherend cannot be specified at the time that the vibration damper material is produced.

SUMMARY OF THE INVENTION

In view of the above-described problems, the object of the present invention is to provide a vibration damper material which exhibits good vibration damping properties and has an excellent ability to follow curved surfaces and excellent adhesive reliability without reducing the operational efficiency when it is applied to the adherend.

In order to achieve this objective, the vibration damper material, according to the present invention, comprises a viscoelastic layer containing an unvulcanized rubber as its main composition and a vulcanizing agent therein, a hardenable pressure sensitive adhesive layer, and a release liner stuck onto the hardenable pressure sensitive adhesive layer.

Since vibration damper materials having the above structure are highly flexible and can be bend easily, they exhibit an excellent ability to follow an adherend having curved surfaces and an excellent operational efficiency when it is applied onto the adherend, and, in particular, it exhibits these advantageous effects to a sufficient degree even when the curved surface has a large radius of curvature.

In addition, by vulcanizing the viscoelastic layer after the vibration damper material of the present invention has been stuck to the adherend, it is possible to obtain an excellent vibration damping effect and noise-absorbing effect for the adherend. Further, by curing the hardenable pressure sensitive adhesive layer, it is also possible to obtain a strong adhesive strength, thus leading to a high bonding reliability.

In the present invention, it is preferred that the vibration damper material is further comprised of a barrier layer provided between the viscoelastic layer and the hardenable pressure sensitive adhesive layer for preventing migration of organic components.

It is also preferred that the unvulcanized rubber of the viscoelastic layer has a rubber viscosity of 10 to 80 (JIS K-6300 Rotor L Model Mooney viscometer $ML_{1+4}$ (100° C.)) before vulcanization.

It is also preferred that the viscoelastic layer has a modulus of dynamic shearing elasticity of $1\times10^6$ to $1\times10^{10}$ $dyn/cm^2$ after vulcanization.

It is also preferred that the hardenable pressure sensitive adhesive layer contains a sticking polymer, a reactive oligomer, and a polymerization initiator.

BRIEF DESCRIPTION OF THE DRAWINGS

FIG. 3 is a cross-sectional view of a third embodiment of the vibration damper material of the present invention; and FIG. 4 is a cross-sectional view of a fourth embodiment of the vibration damper material of the present invention.

DESCRIPTION OF THE INVENTION

The vibration damper material of the present invention is described in detail below based on the preferred embodiments shown in the accompanying drawings.

Figure 1:
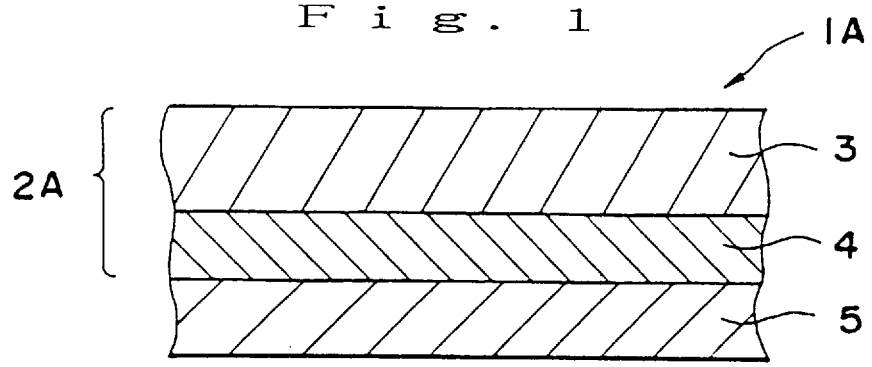
FIG. 1 is a cross-sectional view of a first embodiment of the vibration damper material of the present invention.

FIG. 1 is a cross sectional view illustrating a first embodiment of the vibration damper material according to the present invention. As shown in FIG. 1, the vibration damper material 1A of the present invention comprises a laminate body 2A in which a viscoelastic layer 3 and a hardenable pressure sensitive adhesive layer 4 are laminated together, and a release liner 5 applied onto the hardenable pressure sensitive adhesive layer 4. Each of these layers is described hereinbelow.

[1] Viscoelastic layer 3

The viscoelastic layer 3 is a layer which principally exhibits a vibration damping effect and impact-noise absorbing effect (hereinafter, referred to in general as "vibration damping effect" or "vibration damping properties"). Namely, the viscoelastic layer 3 is a layer which constitutes a vibration damping layer. This viscoelastic layer 3 is comprised of a viscoelastic material (precursor of a vibration damping layer material). The composite material of this layer includes unvulcanized rubber as a main composition and a vulcanizing agent (crosslinking agent) added thereto.

Unvulcanized rubbers which may be mentioned by way of example include natural rubber (NR), isoprene rubber (IR), butadiene rubber (BR, 1,2-BR), styrene-butadiene rubber (SBR) and other such butadiene rubbers, chloroprene rubber (CR), butadiene-acrylonitrile rubber (NBR) and other such diene-based speciality rubbers, butyl rubber (IIR), ethylene-propylene rubbers (EPM, EPDM), acrylic rubbers (ACM, ANM), halogenated butyl rubbers (X-IIR) and other such olefin-based rubbers, urethane rubbers (AU, EU) and other such urethane-based rubbers, hydrin rubbers (CO, ECO, GCO, EGCO) and other such ether-based rubbers, polysulfide rubbers (T) and other such polysulfide-based rubbers, silicone rubbers (Q), fluorine rubbers (FKM, FZ), polyethylene chloride (CM) and the like, or a blend of any desired two or more of these. Among these rubbers, NR, IR, BR, SBR, CR, NBR, IIR, ACM, ANM or, a substance in which any one of these rubbers is utilized as a main composition, is particularly preferred.

It should be noted that the term unvulcanized rubber in the present invention is a concept including semi-vulcanized rubber which has been partially vulcanized (partially crosslinked). For example, it refers to those in which the degree of partial crosslinking is 50% or less, and more particularly 20% or less.

There is no particular limit on the average molecular weight of the unvulcanized rubber. However, about 100,000 to 1,000,000 is preferred, and 200,000 to 700,000 is more preferred.

Vulcanizing agents (crosslinking agents) which may be mentioned include, for example, sulfur, peroxides, oxides of metals such as zinc and magnesium, selenium, tellurium and compounds thereof, and the azo-based compounds discussed hereinbelow. Among these substanses, sulfur and organic peroxides are particularly preferred.

Powdered sulfur, sulfur flowers, deoxygenated sulfur, sediment sulfur, colloidal sulfur, surface-treated sulfur and the like can be used as the sulfur.

Various vulcanization accelerators can be added simultaneously with the sulfur vulcanization. Actual examples of vulcanization accelerators include, for example, tetramethylthiuram disulfide (TMTD), tetramethylthiuram monosulfide (TMTM), N-oxydiethylene-2-benzothiazolyl sulfenamide (OBS), N-cyclohexyl-2-benzothiazolyl sulfenamide (CBS), dibenzothiazyl disulfide (MBTS), 2-mercaptobenzothiazole (MBT), zinc di-n-butyl dithiocarbamate (ZnBDC), zinc dimethyl dithiocarbamate (ZnMDC), and zinc flowers.

Organic peroxides which may be utilized include, for example, di-t-butyl peroxide, t-butylcumyl peroxide, dicumyl peroxide and other such dialkyl peroxides, acetyl peroxide, lauroyl peroxide, benzoyl peroxide and other such diacyl peroxides, methyl ethyl ketone peroxide, cyclohexanone peroxide, 3,3,5-trimethyl cyclohexanone peroxide, methyl cyclohexanone peroxide and other such ketone peroxides, 1,1-bis (t-butyl peroxy) cyclohexane and other such peroxyketals, t-butyl hydroperoxide, cumene hydroperoxide, 1,1,3,3-tetramethyl butyl hydroperoxide, p-menthane hydroperoxide, diisopropylbenzene hydroperoxide, 2,5-dimethylhexane-2,5-dihydroperoxide and other such hydroperoxides, t-butyl peroxyacetate, t-butylperoxy-2-ethyl hexanoate, t-butyl peroxybenzoate, t-butyl peroxyisopropyl carbonate and other such peroxy esters.

With such peroxide crosslinking, various polyfunctional monomers and the like can be added simultaneously. Actual examples of polyfunctional monomers which may be utilized include trimethylolpropane trimethacrylate, ethylene glycol dimethacrylate, triallyl isocyanate and diallyl phthalate.

The preferred amount of the above-mentioned sulfur vulcanizing agent which is typically utilized is 1 to 100 parts by weight, and more preferably 50 to 90 parts by weight with respect to 100 parts by weight of the above-mentioned unvulcanized rubber. Further, the preferred amount of the above-mentioned organic peroxide vulcanizing agent which is typically utilized is 1 to 40 parts by weight, and more preferably 10 to 30 parts by weight with respect to 100 parts by weight of the above-mentioned unvulcanized rubber. If the amount of such a vulcanizing agent is too small, then curing of the viscoelastic layer by crosslinking will be insufficient, while, if the amount of vulcanizing agent is too great, then the crosslinked article will deform and break or suffer similar deleterious effects due to the reaction heat during crosslinking.

In addition, a softening agent (plasticizer) may also be added to the viscoelastic layer 3.

The softening agents which may be utilized are mineral oil based softening agents which are generally known as process oils or extender oils. The preferred softening agent is a mixture combining three constituents, namely aromatic rings, naphthene rings and paraffin rings. Among these agents, paraffin based ones are those in which the number of carbon atoms in paraffin chains accounts for at least 50% of all the carbon atoms, naphthene based ones are those in which the number of naphthene ring carbon atoms is 30 to 45%, and aromatic based ones are those in which the number of aromatic carbon atoms is greater than 30%, and any of these can be used.

The amount of such softening agents which is added is preferably 0 to 100 parts by weight, and more preferably 10 to 50 parts by weight with respect to 100 parts by weight of the above-mentioned unvulcanized rubber.

Various fillers may be added to the viscoelastic layer 3 in order, for example, to improve the physical properties of the viscoelastic layer 3.

Fillers which can be used include various inorganic or organic fillers. As for the inorganic fillers which can be utilized, examples include silica, alumina, diatomaceous earths, titanium oxide, iron oxide, zinc oxide, magnesium oxide, metal ferrite and other such oxides; aluminum hydroxide, magnesium hydroxide and other such hydroxides; calcium carbonate (light and heavy), magnesium carbonate, dolomite, dawsonite and other such carbonates; calcium sulfate, barium sulfate, ammonium sulfate, calcium sulfite and other such sulfates and sulfites; talk, mica, clay, glass fiber, calcium silicate, montmorillonite, bentonite and other such silicates; zinc borate, barium metaborate, aluminum borate, calcium borate, sodium borate and other such borates; carbon black, graphite, carbon fibre and other such forms of carbon; as well as powdered iron, powdered copper, powdered aluminum, zinc flowers, molybdenum sulfate, boron fibre, potassium titanate, and lead titanate zirconate.

Synthetic resin powders can be utilized as the organic fillers. As for the synthetic resin powders, examples include powders of alkyd resins, epoxy resins, silicone resins, phenolic resins, polyester, acrylic resins, acetal resins, polyethylene, polyether, polycarbonate, polyamide, polysulfone, polystyrene, polyvinyl chloride, fluoro resins, polypropylene, ethylene-vinyl acetate copolymers and various other such thermosetting resins or powder of thermoplastic resins, or powders of copolymers of these resins. Further, other examples of organic fillers which can be utilized include aromatic or aliphatic polyamide fibers, polypropylene fibers, polyester fibers and aramid fibers.

The amount of fillers utilized will differ depending on such factors as the type of filler, but normally it will preferably be 0 to 600 parts by weight, and more preferably 10 to 400 parts by weight with respect to 100 parts by weight of the unvulcanized or vulcanized rubber mentioned above.

Furthermore, various inorganic or organic additives may be added to the viscoelastic layer 3 if required. For example, reinforcing agents, lubricants, anti-ageing agents, anti-mold agents, tackifiers, auxiliary processing agents, foaming agents or defoaming agents and pigments (colouring agents) or the like. Among these agents, antioxidants for rubber or metal dithiocarbamates are examples of anti-ageing agents.

The viscoelastic layer 3, as described above, has such a viscoelasticity that it can easily be formed to follow the shape of the adherend when the vibration damper material 1A is applied onto the adherend and it will be hard to restore to its original state, even when an external force exerted thereto is eliminated.

In this case the rubber viscosity of the viscoelastic layer 3 before vulcanization is preferably 10 to 80, and more preferably 30 to 70 (JIS K-6300 Rotor L Model Mooney viscometer $ML_{1+4}$ (100° C.)). If the rubber viscosity before vulcanization is too low, the operating efficiency and the convertibility will be impaired, and the vibration damping properties of the viscoelastic layer 3 after vulcanization will be impaired. On the other hand, if the rubber viscosity before vulcanization is too high, the ability to follow the shape of the adherend will be impaired.

Further, the modulus of dynamic shearing elasticity of the viscoelastic layer 3 after vulcanization is preferably $1 \times 10^6$ to $1 \times 10^{10}$ dyn/cm², and more preferably $1 \times 10^7$ to $1 \times 10^9$ dyn/cm². If the modulus of dynamic shearing elasticity after vulcanization is too low, the viscosity at high temperatures will be increased and the vibration damping properties will be impaired. On the other hand, if the modulus of dynamic shearing elasticity after vulcanization is too high, the restitutive elasticity will be increased and the vibration damping properties will be impaired.

The modulus of dynamic shearing elasticity and the rubber hardness before and after vulcanization can be appropriately adjusted by the types and the added amounts of the above-mentioned vulcanizing agents, softening agents and fillers.

The above viscoelastic layer 3 can be produced by milling the above-mentioned unvulcanized rubber, vulcanizing agent (crosslinking agent) and other necessary additives, and using calendar rollers, an extruder or the like to form the milled basestock into a sheet shape. Further, it can also be produced by a coating method discussed below.

[2] hardenable pressure sensitive adhesive layer 4

The hardenable pressure sensitive adhesive layer 4 comprises a pressure sensitive adhesive which is sticky in the uncured state, but will have a strong adhesive force when it is cured by heating, irradiation by light or blocked from air. One of the representative examples of such hardenable pressure sensitive adhesives is an adhesive containing (A) a sticking polymer, (B) a reactive oligomer (or monomer) and (C) a polymerization initiator. This example includes the thermocuring type, light-curing type and anaerobically curing type. The constituents are described below.

(A) Sticking polymers

Any of the rubber-based, acrylic-based or silicone-based substances may be used for the sticking polymer. However, among these substances, the acrylic-based ones, that is sticking acrylic polymers, are particularly preferred.

Substances which may be mentioned as representative of such sticking acrylic polymers are those consisting of polymers or copolymers whose main components are a low-Tg main monomer component which gives sticking properties, a high-Tg co-monomer component which gives adhesive properties and cohesive strength, and a monomer component containing a functional group intended to improve crosslinking and bonding properties.

Substances which may be mentioned, by way of example, as the main monomer component described above include ethyl acrylate, butyl acrylate, amyl acrylate, 2-ethylhexyl acrylate, octyl acrylate, cyclohexyl acrylate, benzyl acrylate and other such alkyl acrylate esters, and butyl methacrylate, 2-ethylhexyl methacrylate, cyclohexyl methacrylate, benzyl methacrylate and other such alkyl methacrylate esters.

Substances which may be mentioned, by way of example, as the co-monomer component described above include methyl acrylate, methyl methacrylate, ethyl methacrylate, vinyl acetate, vinyl propionate, vinyl ether, styrene, acrylonitrile and methacrylonitrile.

Substances which may be mentioned, by way of example, as the monomer component containing a functional group include monomers containing carboxyl groups such as acrylic acid, methacrylic acid, crotonic acid, maleic acid, fumaric acid and itaconic acid; monomers containing hydroxyl groups such as 2-hydroxyethyl acrylate or methacrylate, 2-hydroxypropyl acrylate or methacrylate, 4-hydroxybutyl acrylate or methacrylate, N-methylol acrylamide and allyl alcohol; monomers containing tertiary amino groups such as dimethyl aminoethyl acrylate or methacrylate, diethyl aminoethyl acrylate or methacrylate and dimethyl aminopropyl acrylate or methacrylate; monomers containing amido groups such as acrylamide and methacrylamide; monomers containing N-substituted amido groups such as N-methyl acrylamide or methacrylamide, N-ethyl acrylamide or methacrylamide, N-methoxymethyl acrylamide or methacrylamide, N-ethoxymethyl acrylamide or methacrylamide, N-t-butyl acrylamide and N-octyl acrylamide; and monomers containing epoxy groups such as glycidyl methacrylate.

The reason such materials are preferred is that they have excellent adhesive and cohesive strength and can obtain the quality and properties which are desired for a given application by selecting the type and molecular weight of the monomer.

(B) Reactive oligomers

Examples of reactive oligomers which may be mentioned include oligo acrylates or methacrylates having one or more acryloyl groups and/or methacryloyl groups in the molecule (referred to as "oligo acrylates or methacrylates" hereinbelow). The following types of substances can be mentioned as examples of the oligo acryates or methacryates.

(i) Vinyl ester resins (epoxy acrylate or methacrylate)

These are oligo acrylates or methacrylates having one or more acryloyl groups and/or methacryloyl groups in the molecule, obtained by reacting an epoxy resin with acrylic acid or methacrylic acid.

(ii) Polyester acrylates or methacrylates

These are oligo acrylates or methacrylates synthesized by bonding an acrylic acid or methacrylic acid with any desired polybasic acid and polyhydroxyl alcohol.

(iii) Polyurethane acrylates or methacrylates

These are oligo acrylates or methacrylates having one or more acryloyl groups and/or methacryloyl groups in the molecule, obtained by reacting an unsaturated alcohol jointly possessing a hydroxyl group, acryloyl group or methacryloyl group in the same molecule, a polyvalent isocyanate compound, polyhydroxyl compound or polyhydroxyl polymers.

(iv) Spiroacetal acrylates or methacrylates

These are oligo acrylates or methacrylates having a spiroacetal structure in the molecular structure, obtained by reacting the same unsaturated alcohols as in (iii) above, polyhydroxyl compounds or polymers with diallylidene pentaerythritol.

Further, other reactive oligomers which can be used include unsaturated polyester oligomers obtained by reacting compounds having a hydroxyl group, cyclic acid anhydrides and epoxides having ethylenically unsaturated groups (Such reactive oligomers are for example shown in Japanese Laid-Open Patent Publication No. Hei 5-9452).

Further, by way of other reactive oligomers, various allyl ether oligomers or polymers having the above-mentioned sticking polymers (A) as the main chain and unsaturated bonds as the side chains, may also be utilized. In this case, the hardenable pressure sensitive adhesive composition may, but need not, contain the sticking polymer of (A) mentioned above.

(C) Polymerization initiator

Examples of polymerization initiators which can be used when the hardenable pressure sensitive adhesive is thermosetting or anaerobically setting include the same organic peroxides as those mentioned in connection with the above-mentioned viscoelastic layer 3, and 2,2'-azobis(4-methoxy-2,4-dimethyl valeronitrile), 2,2'-azobis (2-cyclopropyl propyonitrile), 2,2'-azobis (2,4-dimethyl valeronitrile), azobis isobutyronitrile, 2,2'-azobis (2-methylbythyronitrile), 1,1'-azobis (cyclohexane-1-carbonitrile), 2-(carbamoylazo) isobutyronitrile, 2-phenylazo-4-methoxy-2,4-dimethylvaleronitrile and other such azo-based compounds.

There is no particular limit on the amount of such polymerization initiators which may be utilized. However, it is preferably about 0.1 to 60 parts by weight, and more preferably about 1 to 50 parts by weight with respect to 100 parts by weight of the above-mentioned reactive oligomer of (B).

In addition, polymerization accelerators may be added. For example, it is preferable to add a polymerization initiator when using an organic peroxide with a reduced radical-generating rate.

As polymerization accelerators, it is possible to use tertiary amines such as N,N-dimethylbenzylamine, triethylamine, tributylamine, N,N-diethylaniline, N,N-dimethylaniline, N-phenyldiethanolamine, N-phenyldiisopropanolamine, dimethyl-p-toluidine, triethanolamine and 4-phenylmorpholine and the like. In addition, it is also possible to use metal compounds selected from aliphatic acid salts such as laurates, napthenates, octylates, oleates and octenates; resinates such as rosin salts; and chelate compounds such as the acetyl acetonate complex salts; and the like. Example of the metals which constitute such metal compounds include lithium, calcium, strontium, barium, cerium, zirconium, vanadium, molybdenum, manganese, iron, cobalt, nickel, copper, zinc, tin and lead and the like. In this case, one or two or more of the above-mentioned substances can be used as the polymerization accelerators.

In particular, when anaerobic curing is involved, it is preferred that a polymerization accelerator of a tertiary amine or metal compound, or both, is used in combination with organic peroxides. Among these polymerization accelerators, the tertiary amines are preferably used in a proportion of 1 to 100 parts by weight with respect to to 100 parts by weight of organic peroxide, and the metal compounds are preferably used in a proportion of 0.01 to 10 parts by weight with respect to 100 parts by weight of organic peroxide.

Examples of polymerization initiators used when the hardenable pressure sensitive adhesive is of a light-curing type include benzoin, benzoin methyl ether, benzoin ethyl ether, o-methyl-benzoylbenzoate, p-benzoin ethyl ether, benzoin isopropyl ether, α-methylbenzoin and other such benzoins; dimethylbenzyl ketal, trichloroacetophenone, 2,2-diethoxyacetophenone and other such acetopehnones; 2-hydroxy-2-methylpropiophenone, 2-hydroxy-4'-isopropyl-2-methylpropiophenone and other such propiophenones; α-acyloxym ester, benzophenone, methylbenzophenone, p-chlorobenzophenone, p-dimethylaminobenzophenone and other such benzophenones; 2-chlorothioxanthone, 2-ethylthioxanthone, 2-isopropylthioxanthone and other such thioxanthones; benzyl and dibenzosuberone.

There are no particular limits on the amount of such polymerization initiators which may be utilized, however, it is preferably about 0.1 to 40 parts by weight with respect to 100 parts by weight of the above-mentioned reactive oligomer of (B), and more preferably 1.0 to 20 parts by weight.

Further, such polymerization initiators may be used together with polymerization accelerators such as, for example, 4,4'-bis(diethylamine)benzophenone, N-(dimethylamino)ethyl benzoate, dimethylethanolamine and glycine.

In this case, it should be noted that the above polymerization initiators and polymerization accelerators can also be formed into microcapsules before being added in order to improve stability in storage.

Furthermore, examples of other hardenable pressure sensitive adhesives which can be utilized in the present invention include ones which are disclosed in Japanese Patent Publication No. Sho 50-28970, Japanese Patent Publication No. Sho 53-31898, Japanese Laid-open Patent Publication No. 53-118439, Japanese Patent Publication No. Sho 54-28877, Japanese Laid-open Patent Publication No. Sho 60-69178, Japanese Patent Publication No. Sho 61-18591, Japanese Laid-open Patent Publication No. Sho 61-83273, Japanese Laid-open Patent Publication No. Sho 61-83274, Japanese Laid-open Patent Publication No. Sho 61-101583, Japanese Patent Publication No. Hei 1-36513, Japanese Patent Publication No. Hei 2-5791, Japanese Laid-open Patent Publication No. Hei 1-188508, Japanese Laid-open Patent Publication No. Hei 1-193314, Japanese Laid-open Patent Publication No. Hei 1-193315, Japanese Laid-open Patent Publication No. Hei 3-66779, Japanese Laid-open Patent Publication No. Hei 3-66780, Japanese Laid-open Patent Publication No. Hei 3-66781, Japanese Laid-open Patent Publication No. Hei 3-66782, Japanese Laid-open Patent Publication No. Hei 3-66783, and Japanese Laid-open Patent Publication No. Hei 3-66784.

Further, various additives can be added to the hardenable pressure sensitive adhesive layer 4 if required. For example, tackifiers, softening agents (plasticizers), fillers, anti-ageing agents and polyisocyanates or the like may be added to improve the cohesive strength. Examples of such tackifiers include rosin and derivatives thereof, polyterpene, terpene phenol resin, coumarone-indene resin, petroleum-based resins, styrene resins and xylene resins. Examples of such softening agents include liquid polybutene, mineral oil, lanolin, liquid polyisoprene and liquid polyacrylate. The same fillers and anti-ageing agents as those mentioned in connection with the viscoelastic layer 3 mentioned above can be utilized as the fillers and anti-ageing agents in the hardenable pressure sensitive adhesive layer 4.

The above hardenable pressure sensitive adhesive layer can be formed by a coating method. This is to say, a coating agent (viscosity of about 300 to 50,000 cps) comprising a mixture of (A) to (C) mentioned above with other necessary additives is prepared and this is coated onto the viscoelastic layer 3 mentioned above or the silicone layer of a release liner which is discussed hereinbelow, and then they are dried. In this case, the coating agent may be organic solvent based, emulsion based or water based.

Coating methods which might be mentioned include brush coating, spatula coating, pressure spraying, spraying using an air spraying machine, an airless spraying machine or the like, flow coating, roll coating or dipping.

[3] Release liner 5

A release liner 5 is placed around the hardenable pressure sensitive adhesive layer 4 before it has been used. Any known release liner may be utilized as the release liner 5, and it is possible to use, for example, one in which a silicone layer has been formed on the surface where the base material bonds with the hardenable pressure sensitive adhesive layer 4. In this case, base materials for the release liner 5 can be formed from, for example, a paper material such as glassine paper, and a resin film consisting of polyethylene, polypropylene or polyester.

It should be noted that when the above-mentioned hardenable pressure sensitive adhesive layer 4 uses an anaerobically curing hardenable pressure sensitive adhesive, the release liner 5 is formed from one which should be porous to air such as a paper material.

Figure 2:
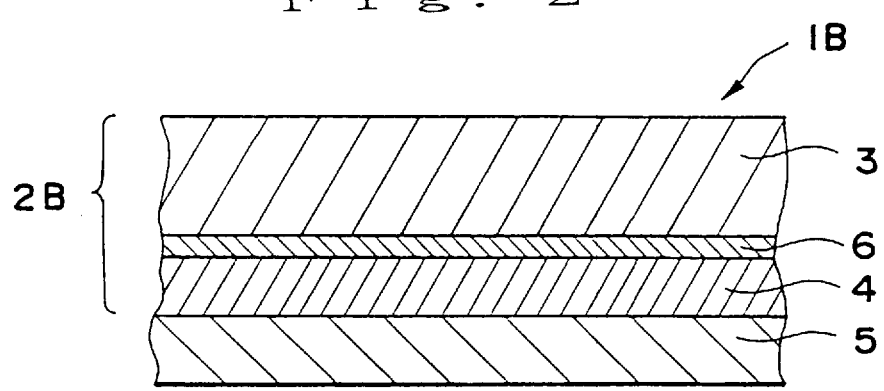
FIG. 2 is a cross-sectional view of a second embodiment of the vibration damper material of the present invention.

FIG. 2 is a cross sectional view showing a second embodiment of the vibration damper material of the present invention. The vibration damper material 1B shown in this figure is the same as the above-mentioned vibration damper material 1A except that a laminate body 2B including a barrier layer 6 which has been introduced between the viscoelastic layer 3 and the hardenable pressure sensitive adhesive layer 4 is used. In this case, the compositions of the viscoelastic layer 3, the hardenable pressure sensitive adhesive layer 4 and the release liner 5 are the same as those described above, and therefore, only the barrier layer 6 is discussed below.

[4] Barrier layer 6

The barrier layer 6 is intended to prevent (block) organic components contained in either the viscoelastic layer 3 or the hardenable pressure sensitive adhesive layer 4 from migrating into other layers.

For example, when the vulcanizing agent contained in the viscoelastic layer 3 is sulfur and the polymerization initiator contained in the hardenable pressure sensitive adhesive layer 4 is an organic peroxide, it is possible to prevent the organic peroxide from migrating into the viscoelastic layer 3 by providing the barrier layer 6. In addition, it is also possible to prevent the vulcanization of the unvulcanized rubber in the viscoelastic layer 3.

Further, when one of the above-mentioned softening agents is included in the viscoelastic layer 3, and particularly when it has been added in a large amount, the liquid constituent of the softening agent (plasticizer) can be prevented from migrating into the hardenable pressure sensitive adhesive layer 4 by providing the barrier layer 6. As a result, denaturing and degradation of the hardenable pressure sensitive adhesive layer 4 or reduction in its adhesive strength and cohesion force can be prevented by providing the barrier layer 6.

Constituent materials for such a barrier layer 6 which might be mentioned include, for example, polymers or copolymers mainly comprising acrylic acid, methacrylic acid or derivatives thereof. Examples of derivatives of acrylic acid or methacrylic acid include methyl acrylate, methyl methacrylate, ethyl acrylate, ethyl methacrylate, hydroxyethyl acrylate, hydroxyethyl methacrylate, hydroxypropyl acrylate, hydroxypropyl methacrylate, dimethylaminoethyl methacrylate and other such acrylic esters or methacrylic esters, acrylamide and acrylonitrile.

Further, examples of other constituent materials for the barrier layer 6 include polyether-based derivatives, polyester-based derivatives, polyurethane-based derivatives, silicone-based derivatives, polyimide-based derivatives, as well as polyvinylidene chloride (PVDC), polyvinyl alcohol (PVA), ethylene-vinyl alcohol copolymers (EVAL) and fluoro resins.

Particularly preferred constituent materials for the barrier layer 6 mentioned above are polyvinylidene chloride or polymers or copolymers mainly comprising acrylic esters or methacrylic esters.

The average molecular weight of the macromolecular materials typified by acrylic-based polymers as mentioned above, is preferably about 50,000 to 5,000,000, and more preferably about 100,000 to 1,000,000.

Further, additives such as, for example, the above-mentioned fillers, degradation-preventing agents, crosslinking agents and viscosity-adjusting agents and the like can be added to the constituent material of the barrier layer 6 if required.

This barrier layer 6 can be formed by one of the above-mentioned coating methods. In this case, the coating liquid may be organic solvent based, emulsion based or an aqueous solution. Moreover, the viscosity of the coating liquid is preferably about 10 to 10,000 cps (at room temperature).

The above-mentioned barrier layer 6 preferably has hydrophilic properties when the blocked organic constituent is an oil constituent. To obtain hydrophilic properties, the material constituting the barrier layer 6 may itself have hydrophilic properties, or a conversion in which the layer 8 is rendered hydrophilic may be carried out using a method such as plasma converting or applying a surfactant on the surface of the layer 8 after it has been formed.

Further, although this is not depicted, an intermediate layer such as a primer layer may be provided between the viscoelastic layer 3 and the barrier layer 6 or between the barrier layer 6 and the hardenable pressure sensitive adhesive layer 4. The main reason for forming this intermediate layer is to improve the bonding force between the barrier layer 6 and the viscoelastic layer 3 or hardenable pressure sensitive adhesive layer 4. In this case, it is preferred that an intermediate layer formed for the above reason is formed of a boding agent.

Examples of the bonding agents which constitute the intermediate layer include thermosetting resin adhesives mainly composed of phenolic resins, resorcin resins, furan resins, urea resins, melamine resins, polyester resins, polyurethane resins, epoxy resins and silicone resins or the like; thermoplastic resin adhesives mainly composed of polyvinyl acetate, polyvinyl alcohol, polyvinyl chloride, polyvinyl butyral, and, as discussed above, alkyl acrylate esters, alkyl methacrylate esters and nitrocellulose; rubber-based adhesives mainly composed of rubbers such as butadiene-acrylonitrile rubber and neoprene rubber; and natural adhesives such as glues, casein and gum arabic. In these cases, these may be liquid, in an organic solution or in an emulsion.

It should be noted that the formation of the intermediate layers is not limited to the bonding purpose mentioned above. Such an intermediate layer can also be provided on the vibration damper materials 1C and 1D discussed hereinbelow.

FIG. 3 is a cross sectional view illustrating a third embodiment of the vibration damper material of the present invention. The vibration damper material 1C shown in FIG. 3 is the same as the above-mentioned vibration damper material 1A except that it uses a laminate body 2C having a supporting layer (constraining layer) 7 on the side of the viscoelastic layer 3 opposite the hardenable pressure sensitive adhesive layer 4. Because, in this case, the configuration of the viscoelastic layer 3, hardenable pressure sensitive adhesive layer 4 and release liner 5 are the same as described above, only the supporting layer 7 is discussed below.

[5] Supporting layer 7

The supporting layer 7 functions as a base supporting the viscoelastic layer 3 and the hardenable pressure sensitive adhesive layer 4. In this embodiment, it is preferred that the supporting layer 7 has flexibility in itself and is suited to a cutting or punching processing.

The supporting layer 7 may be a porous material or a non-porous material. Porous materials which may be mentioned include non-fiber and fiber porous materials.

Examples of such non-fiber porous materials include membrane filters, foamed bodies and meshes and the like.

Examples of such fiber porous materials include knits and weaves, nonwoven fabrics, papers and collections of short fibers. Here, knits and weaves include woven goods and knitted goods and articles analogous thereto. All types of woven textiles which are used in practice can be used, such as plain weave and biasing weave. Further, with regard to the knitted textiles, there are no particular restrictions, and therefore, it is possible to use plain weave, tricot, circular knit, flat braid and stockinette and the like. When a nonwoven fabric is used, there are no particular limits on such aspects as the packing density (bulk density) of the fibers. Papers which can be used include normal papers and various synthetic papers.

Examples of the fibers constituting such porous fiber materials include natural fibers such as cellulose fibers, cotton, cotton linters, flax, hemp, ramie, silk and wool, chemical fibers such as nylon, tetron, rayon, cuprammonium rayon, acetate, vinylon, acrylic and polyethylene terephthalate, and various metal fibers (fine metal strands), or combinations (blended fabrics and the like) of two or more of these.

Examples of the supporting layers 7 of non-porous materials include films of various resins such as polypropylene, polyethylene, soft polyvinyl chloride, polystyrene and polyethylene terephthalate, and, for example, soft metal foils such as aluminium foil and lead sheeting.

Further, the supporting layer 7 may be a combination (for example a laminate) of any two or more of the above-mentioned porous materials and non-porous materials. Examples which may be mentioned include a laminated material of aluminum foil and resin film, and a porous fiber material adhered with a resin film.

Moreover, when the above-mentioned viscoelastic layer 3 is coated onto one side of a supporting layer 7, it is preferable that the supporting layer 7 is itself gaspermeable so that the coated film dries well and evenly. Examples of such gas-permeable materials include the various non-fiber or fiber porous materials mentioned above, foamed polypropylene film and foamed polyethylene film.

Further, when a viscoelastic layer 3 containing oil constituents or the like is bonded to the supporting layer 7, the supporting layer 7 is preferably hydrophilic. This prevents the above constituents from migrating from the viscoelastic layer 3.

Moreover, a vibration damper material 1C having a supporting layer 7 may also have a configuration in which the above-mentioned barrier layer 6 is placed between the viscoelastic layer 3 and the hardenable pressure sensitive adhesive layer 4.

Further, instead of the supporting layer 7, layers with other purposes may be formed such as protective layers, reinforcing layers and water-repelling layers.

FIG. 4 is a cross sectional view illustrating a fourth embodiment of the vibration damper material according to the present invention. The vibration damper material 1D shown in FIG. 4 comprises a double-sided pressure sensitive adhesive sheet (tape), involving a configuration in which release liners 5 are respectively stuck onto two hardenable pressure sensitive adhesive layers 4 of a laminate 2D in which said hardenable pressure sensitive adhesive layers 4 have been bonded onto either side of the viscoelastic layer 3, via respective barrier layers 6. In this case the configurations of the viscoelastic layer 3, the barrier layers 6, the hardenable pressure sensitive adhesive layers 4 and the release liners 5 are the same as mentioned above.

In addition, the vibration damper material 1D may also have a configuration from which the barrier layers 6 have been omitted.

In the vibration damper materials 1A to 1D with the configurations described above, the thickness of the viscoelastic layer 3 is preferably about 1 to 10 mm, and more preferably 2 to 4 mm. If the thickness of the viscoelastic layer 3 is too thin, there is the risk that adequate vibration damping properties will not be obtained. On the other hand, if the thickness of the viscoelastic layer 3 is too thick, operational efficiency will be reduced, for example, when it is stuck onto the adherend having a large radius of curvature.

The thickness of the hardenable pressure sensitive adhesive layer 4 is preferably about 10 to 200 $\mu$m, and more preferably 20 to 100 $\mu$m. If the thickness of the hardenable pressure sensitive adhesive layer 4 is too thin, there is the risk that an adequate adhesive force will not be obtained. On the other hand, if the thickness of the hardenable pressure sensitive adhesive layer 4 is too thick, the thickness of the laminate body 2A–2D becomes large. As a result there will be the risk that the operational efficiency is reduced when it is applied to the adherend having a large radius of curvature.

The thickness of the barrier layer 6 is preferably about 0.1 to 25 $\mu$m, and more preferably about 0.5 to 5 $\mu$m. If the thickness of the barrier layer 6 is too thin, it will have a reduced ability to block the organic constituent, depending on the type and the amount of the organic constituent to be blocked. On the other hand, if the thickness of the barrier layer 6 is too thick, the ability that can follow surfaces and the vibration damping ability are reduced.

It should be noted that the form which the vibration damper material of the present invention takes may be any form such as a sheet of large, medium or small dimension, a label or a long tape.

Hereinbelow, the method of use and the functions of the vibration damper material according to the present invention are now described with reference to an example case in which a vibration damper material is applied to the floor panel of an automobile.

When a vibration damper material 1A–1D of the present invention is applied to the floor panel of an automobile (before it is completed), the release liner 5 is first peeled off. Then, the vibration damper material is applied to the floor panel of the automobile (adherend) using the exposed hardenable pressure sensitive adhesive layer 4, thereby it is temporarily attached thereto. When this is completed, because the viscoelastic layer 3 is formed of an unvalcanized rubber having a relatively high viscosity and a relatively low elasticity, it is easily plastically deformed. Therefore, it readily changes its shape plastically even if the floor panel to which the vibration damper material is to be applied is uneven or curved to some extent. As a result, it will be tightly applied onto the floor panel without gaps and it will not peel even if a long time lapses. In addition, the applying operation can be performed with good operational efficiency.

The floor panel of the automobile is usually sent for paint baking during the process of producing the automobile.

Thus, the vulcanization of the viscoelastic layer 3 and the curing of a thermocuring type of hardenable pressure sensitive adhesive layer 4 are achieved using the heat of the paint baking of the floor panel to which a vibration damper material 1A to 1D has been applied. As a result, the viscoelastic layer 3 cures to exhibit excellent vibration-damping properties and the hardenable pressure sensitive adhesive layer 4 cures to give a strong adhesive force, after cooling. The curing of the viscoelastic layer 3 by vulcanization and the curing of the hardenable pressure sensitive adhesive layer 4 do not require the addition of a special process, since curing is achieved by using the heat during paint baking. Therefore, there is no impairment to operational efficiency or production efficiency.

In this regard, it should be noted that the heating conditions for the vulcanization of the viscoelastic layer 3 and the curing of a thermally curing type of hardenable pressure sensitive adhesive layer 4 are preferably about 100° to 150° C. for 3 to 30 minutes, and more preferably 140° to 150° C. for 20 to 30 minutes. The above-mentioned heat conditions of paint baking coincide with or encompass this range.

When the respective constituent layers are formed of a material which transmits light, the hardenable pressure sensitive adhesive layer 4 may be a light-curing type of hardenable pressure sensitive adhesive layer. As a result, it can be cured by irradiating light (for example visible light, ultraviolet rays, electromagnetic waves).

When using a vibration damper material 1A to 1D which uses an anaerobically curing type of hardenable pressure sensitive adhesive layer 4, curing will start by applying the sheet to the floor panel since air will be blocked from the hardenable pressure sensitive adhesive layer 4. Therefore, a strong adhesive force will be obtained upon completion of curing. In addition, because the ability to follow a curved surface is excellent and the hardenable pressure sensitive adhesive layer 4 will be applied without gaps as discussed above, the anaerobic curing will proceed rapidly and reliably and the strong adhesive force will be maintained.

The vibration damper material of the present invention is not limited to use on the floor panels of automobiles as mentioned above. It can also be used, for example, in various places in the chassis, trunk compartments, bodies and around the engines of vehicles including automobiles, aircraft, building machinery and the like. In addition, it can also be applied in a variety of places such as various electric appliances like air conditioners, refrigerators, washing machines, and ventilating fans; gas appliances such as water boilers and hot-bath boilers; various items of office equipment such as photocopiers, printers, facsimiles and audio equipment; various items of industrial equipment such as compressors, hoppers, lathes, milling machines, electrically operated tools; various motors and precision devices; construction and civil engineering materials such as flooring, ceilings, Japanese-style shutters, window frames, roofs, Western-style shutters, doors, sound-proof walls, quake-proof walls, gas pipes and water pipes; office furniture such as steel desks, chairs and stationary cupboards; commodities and sports products such as metal containers, grips of golf clubs, bats and racquets, skis and helmets.

THE DETAILED DESCRIPTION OF THE PREFERRED EMBODIMENTS

The present invention will now be described in more detail with reference to the following embodiments.

(Embodiment 1)

The vibration damper material 1A, with the configuration shown in FIG. 1, was produced as follows:

[Production of a viscoelastic layer 3]

A rubber starting material was kneaded in a kneader and then milled with additives. The resulting milled basestock was press formed, extrusion formed and calendar formed on a casting paper to form a sheet with a size of 400 mm×1,000 mm.

[Production of a hardenable pressure sensitive adhesive layer 4]

A thermosetting hardenable pressure sensitive adhesive composition, in which a sticking polymer, reactive oligomer and polymerization initiator had been adjusted utilizing diluting solvents, was coated onto the silicone surface of a release liner 5. Thereafter, drying was carried out at 60° to 100° C. for 0.5 to 10 minutes in such a way that the dried thickness was 10 to 200 μm. Then, another release liner 5 having the same composition as that of the above-described release liner 5 is covered onto the coated surface in such a manner that these tow release liners 5 sandwich the hardenable pressure sensitive adhesive layer 4, thereby obtaining a hardenable pressure sensitive adhesive sheet.

[Lamination of the respective layers]

A vibration damper material 1A was obtained by applying the hardenable pressure sensitive adhesive layer 4 together with the viscoelastic layer 3, while removing one of the release liners 5 of the hardenable pressure sensitive adhesive layer 4.

The configuration and conditions of the respective layers are as outlined below:

| Viscoelastic Layer 3 | |
|---|---|
| Composition: | |
| Unvulcanized styrene/butadiene rubber | 60 parts by weight |
| Styrene resin | 40 parts by weight |
| Calcium carbonate | 200 parts by weight |
| Vulcanizing agent: peroxide | 15 parts by weight |
| Vulcanization accelerator: zinc flowers | 5 parts by weight |
| Reinforcing agents/additives | 85 parts by weight |
| Thickness: | 2.0 mm |
| Mooney viscosity before vulcanization (ML $_{1+4}$ (100° C.)): | 40 |
| Rubber hardness after vulcanization (JIS K-6301, JIS-A Type Hardness Meter): | 80 |
| Modulus of dynamic shearing elasticity after vulcanization: | $3.8 \times 10^8$ dyn/cm$^2$ |
| Hardenable Pressure Sensitive Adhesive Layer 4 | |
| Composition: | |
| Sticking polymer: an acrylic-based sticking polymer (produced by Nippon Carbide Industries, Inc.) (PE-121 (product number)) | 100 parts by weight |
| Reactive oligomer: an epoxy acrylate (produced by Showa Highpolymer Co., Ltd. (REPOXY H-6001 (tradename)) | 10 parts by weight |
| Polymerization initiator: an organic peroxide | 2 parts by weight |
| Thickness: | 50 μm |
| Release Liner 5 | |
| Glassine-based release paper 7GX (made by Lintec Corporation) | |

(Embodiment 2)

A barrier layer 6 was formed, by a coating method, on one side of a viscoelastic layer 3 obtained by the same production method as in Embodiment 1. In addition, a hardenable pressure sensitive adhesive layer 4 was formed on the silicone layer of a release liner 5 utilizing the same method as in Embodiment 1. This hardenable pressure sensitive adhesive layer 4 was applied onto the above-mentioned barrier layer 6, to obtain a vibration damper material 1B with the configuration shown in FIG. 2. The configuration and conditions of the layers are as outlined below:

---

Viscoelastic Layer 3

Composition:

| | |
|---|---|
| Unvulcanized styrene/butadiene rubber | 60 parts by weight |
| Styrene resin | 40 parts by weight |
| Calcium carbonate | 200 parts by weight |
| Vulcanizing agent: fine-powdered sulfur | 44 parts by weight |
| Vulcanization accelerator: zinc flowers | 5 parts by weight |
| Reinforcing agents/additives | 85 parts by weight |
| Thickness: | 2.0 mm |
| Mooney viscosity ($ML_{1+4}$ (100° C.)): | 40 |
| Rubber hardness after vulcanisation (JIS K-6301, JIS-A Model Hardness Meter): | 80 |
| Modulus of dynamic shearing elasticity after vulcanization: | $3.8 \times 10^8$ $dyn/cm^2$ |

Barrier Layer 6

Composition:

| | |
|---|---|
| Polyvinylidene chloride (produced by Kureha Chemical Co., Ltd.) (KUREHARON LATEX RA, its tradename) | |
| Thickness: | 5 $\mu$m |

Hardenable Pressure Sensitive Adhesive Layer 4

| | |
|---|---|
| Composition and thickness: | The same as in Embodiment 1 |

Release Liner 5

The same as in Embodiment 1

---

(Embodiment 3)

A viscoelastic layer 3 obtained utilizing the same method as Embodiment 1 was adhered to one side of a supporting layer 7. In addition, a hardenable pressure sensitive adhesive layer 4 was formed on one side of a release liner 5 utilizing the same method as in Embodiment 1. This hardenable pressure sensitive adhesive layer 4 was applied onto the above-mentioned viscoelastic layer 3 to form a vibration damper material 1C with the configuration shown in FIG. 3. The configuration and conditions of the layers are as outlined below.

---

Supporting Layer 7

| | |
|---|---|
| Material: | Nonwoven fabric of rayon fibers. |

Viscoelastic Layer 3

| | |
|---|---|
| Composition, physical properties and thickness: | As in Embodiment 1 |

Hardenable Pressure Sensitive Adhesive Layer 4

| | |
|---|---|
| Composition and thickness: | As in Embodiment 1 |

Release Liner 5

As in Embodiment 1

---

(Embodiment 4)

Two barrier layers 6 were formed, being coated onto both sides of a viscoelastic layer 3 obtained utilizing the same method as in embodiment 1. In addition, two hardenable pressure sensitive adhesive layer sheets were formed by coating hardenable pressure sensitive adhesive layers 4 on the silicone layers of release liners 5, respectively, utilizing the same method as in Embodiment 1. Then, each of the hardenable pressure sensitive adhesive layer sheets is applied by its hardenable pressure sensitive adhesive layer 4 onto each of the two barrier layers 6 to obtain a vibration damper material 1D with the configuration shown in FIG. 4. The vibration damper material 1D is formed from a pressure sensitive adhesive double coated sheet having a seven-layer laminate structure which comprises a first release liner 5; a first hardenable pressure sensitive adhesive layer 4; a first barrier layer 6; a viscoelastic layer 3; a second barrier layer 6; a second hardenable pressure sensitive adhesive layer 4; a second release liner 5. The configuration and conditions of the layers were as outlined below:

---

Viscoelastic Layer 3

| | |
|---|---|
| Composition, physical properties, thickness: | As in Embodiment 2 |

First and Second Barrier Layers 6

| | |
|---|---|
| Composition: | As in Embodiment 2 |
| Thickness: | 5 $\mu$m each |

First and Second Hardenable Pressure Sensitive Adhesive Layers 4

| | |
|---|---|
| Composition: | As in Embodiment 1 |
| Thickness: | 50 $\mu$m each |

First and second release liners

Each the same as in Embodiment 1

---

(Comparative Example 1)

A 3.6 mm thick asphalt base sheet (trade name NW131 produced by Asahi Corporation) was prepared as a vibration damping layer, a 50 $\mu$m thick acrylic-based pressure sensitive adhesive (trade name PK produced by Lintec Corporation) was formed by coating onto one side of the base sheet, and the same release liner as in Embodiment 1 was applied onto this hardenable pressure sensitive adhesive layer, thereby forming a vibration damper sheet.

(Comparative Example 2)

A vibration damper sheet was obtained utilizing the same composition as in Comparative example 1 except that a 2.0 mm thick rubber sheet (rubber hardness of 80 on a JIS K-6301, measured by JIS-A Model hardness meter) was used as the vibration damping layer.

The vibration damper materials of the above-mentioned Embodiments 1 to 4 and the vibration damper sheets of the comparative examples 1 and 2 were subjected to the following tests.

<1> Measuring the adhesion properties on curved surfaces

The vibration damper materials and sheets were cut into tapes of width 20 mm×length 500 mm. The release liners (one release liner in the case of Embodiment 4) of the respective damper materials or sheets were peeled off and the formed tapes were wrapped around round stainless steel bars with an outer diameter of 10 mm. The efficiency in the wrapping operation and the degree of the adhesions of the respective materials and sheets were evaluated. The results are given in Table 1 which follows.

TABLE 1

| Embodiments/ Comparative Examples | Adhesion Properties | | Loss Coefficient | | | |
|---|---|---|---|---|---|---|
| | Efficiency in Wrapping Operation | Conformability to Adherend | 0° C. | 20° C. | 40° C. | 60° C. |
| E1 | Excellent | Good | 0.122 | 0.135 | 0.189 | 0.253 |
| E2 | Excellent | Excellent | 0.105 | 0.125 | 0.166 | 0.231 |
| E3 | Good | Good | 0.103 | 0.106 | 0.153 | 0.203 |
| E4 | Good | Excellent | 0.130 | 0.140 | 0.192 | 0.270 |
| C1 | Poor | Poor | 0.115 | 0.128 | 0.200 | 0.075 |
| C2 | Poor | Poor | 0.103 | 0.130 | 0.152 | 0.122 |

As shown in Table 1, it was confirmed that the vibration damper materials of Embodiments 1 to 4 all contained viscoelastic layers which readily change shape in a plastic manner. Further, it was also confirmed that they had excellent efficiency in the operation of wrapping onto a curved surface, had a good ability to follow the receiving curved surface and maintained a good adhesion property, while they did not produce gaps or blisters, and did not age, peel or change position over time.

In contrast, the vibration damper sheets of Comparative examples 1 and 2 had a poor ability to follow the receiving curved surface, and partially peeled after a time due to the elasticity of the vibration damping layer.

<2> Measuring the vibration damping properties

The vibration damper materials and sheets were cut into sizes of width 30 mm×length 300 mm, the release liners (both release liners in the case of Embodiment 4) were peeled off, and they were then respectively stuck onto steel plates of 30 mm×300 mm×thickness 0.8 mm, thereby preparing test pieces.

These test pieces were then subjected to a heat treatment in an oven at 140° C. for 30 minutes. Thus, as regards the test pieces of Embodiments 1 to 4, the rubber making up the viscoelastic layer vulcanized and cured to form a vibration damping layer, and the hardenable pressure sensitive adhesive layer cured to give a strong adhesive force. Moreover, where anaerobically curing hardenable pressure sensitive adhesive layers are concerned, the adhesive cured after the passage of a predetermined amount of time following their application to the steel plates.

The vibration damping properties of the test pieces obtained utilizing this method were evaluated by measuring the loss coefficient of the vibration damping layer at intervals of 20° C. in a temperature range of 0° to 60° C. The results are shown in Table 1 above.

As shown in Table 1, it was confirmed that Embodiments 1 to 4 all gave vibration damping properties, which were little dependent on temperature and had good loss coefficients at high temperatures.

As described above, vibration damper materials of the present invention are highly flexible and bend easily. Therefore, the vibration damper materials have an excellent ability to follow receiving bodies with curved surfaces and excellent efficiency in application. In particular, they exhibit these advantageous effects to a sufficient degree even when the curved surface has a large radius of curvature.

In addition, vulcanizing the viscoelastic layer after the vibration damper material of the present invention has been applied to the adherend gives an excellent vibration damping property and noise-absorbing effect with respect to the adherend. In addition curing the hardenable pressure sensitive adhesive layer produces a strong adhesive strength and a highly reliable bonding. Finally, it should be noted that the scope of the present invention is not limited to the embodiments described above. The scope of the present invention is decided only by the following claims.

What is claimed is:

1. A vibration damping material, comprising:

a viscoelastic layer containing a major amount of unvulcanized rubber and a vulcanizing agent, wherein said unvulcanized rubber of said viscoelastic layer has a rubber viscosity of 10 to 80 measured according to JIS K-6300 Rotor L Model Mooney viscometer $ML_{1+4}$ (100° C.) before vulcanization of the viscoelastic layer, and wherein the viscoelastic layer is adapted to have a modulus of dynamic shearing elasticity of $10^6$ to $10^{10}$ dyn/cm$^2$ after vulcanization of the viscoelastic layer, and said viscoelastic layer being adapted to be vulcanized after the vibration damping material is stuck onto an adherend;

a hardenable pressure sensitive adhesive layer having a first side on which the viscoelastic layer is positioned and a second side opposite to the first side; and a release liner stuck onto the second side of said hardenable pressure sensitive adhesive layer.

2. The vibration damping material as claimed in claim 1, further comprising a barrier layer provided between said viscoelastic layer and said hardenable pressure sensitive adhesive layer for preventing migration of organic components contained in either of the viscoelastic layer or the hardenable pressure sensitive adhesive layer into the other layer.

3. The vibration damping material as claimed in claim 1, wherein said hardenable pressure sensitive adhesive layer contains a sticking polymer, a reactive oligomer, and a polymerization initiator, wherein the sticking polymer is a tacky polymer.

* * * * *

UNITED STATES PATENT AND TRADEMARK OFFICE
CERTIFICATE OF CORRECTION

PATENT NO. : 5,858,521
DATED : January 12, 1999
INVENTOR(S) : Takuya Okuda et al.

It is certified that error appears in the above-identified patent and that said Letters Patent is hereby corrected as shown below:

On the Title Page

In column 1, item [54], delete "VICSO ELASTIC" and substitute --VISCOELASTIC-- in its place.

In column 2, line 6, under "ABSTRACT", delete "comprised" and substitute --composed-- in its place.

Signed and Sealed this

First Day of May, 2001

Attest:

NICHOLAS P. GODICI

Attesting Officer     Acting Director of the United States Patent and Trademark Office